(12) United States Patent
Beck et al.

(10) Patent No.: US 12,429,396 B2
(45) Date of Patent: Sep. 30, 2025

(54) DIAGNOSIS METHOD FOR A PROCESS VALVE, DIAGNOSIS MODULE AND PROCESS VALVE

(71) Applicant: Buerkert Werke Gmbh & Co. KG, Ingelfingen (DE)

(72) Inventors: Klaus Beck, Ingelfingen (DE); Andreas Ungerer, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 1125 days.

(21) Appl. No.: 17/332,537

(22) Filed: May 27, 2021

(65) Prior Publication Data

US 2021/0373525 A1  Dec. 2, 2021

(30) Foreign Application Priority Data

May 28, 2020 (DE) .................... 10 2020 114 408.3

(51) Int. Cl.
*G01M 3/28* (2006.01)
*F16K 37/00* (2006.01)
*G05B 19/406* (2006.01)
*G05D 7/06* (2006.01)
*G05D 16/20* (2006.01)

(52) U.S. Cl.
CPC ....... *G01M 3/2876* (2013.01); *F16K 37/0025* (2013.01); *F16K 37/0033* (2013.01); *F16K 37/0041* (2013.01); *F16K 37/0058* (2013.01); *G05B 19/406* (2013.01); *G05D 7/0635* (2013.01); *G05D 16/2013* (2013.01); *G05B 2219/45006* (2013.01)

(58) Field of Classification Search
CPC ............. G05D 7/0635; G05D 16/2013; G05D 2219/37333; G05D 2219/45006; F16K 37/0025; F16K 37/0033; F16K 37/0041; F16K 37/0058; G01M 3/2876; G05B 2219/45006; F15B 2211/6336; F15B 19/005

See application file for complete search history.

(56) References Cited

U.S. PATENT DOCUMENTS

2009/0263236 A1* 10/2009 Goll .................... F01D 17/145
 251/129.01
2014/0305525 A1* 10/2014 Le Moing .......... F16K 37/0083
 137/553

(Continued)

FOREIGN PATENT DOCUMENTS

DE  102015111084 A1  3/2016
DE  102016001753 A1  8/2017

(Continued)

*Primary Examiner* — Atif H Chaudry
(74) *Attorney, Agent, or Firm* — Dilworth IP, LLC (57) ABSTRACT

A diagnosis method for continuous function monitoring of a process valve during normal operation. The diagnosis method includes the steps of determining process set data (S) with discrete-time process set values from an input signal supplied to the process valve, b) determining process actual data (s) with discrete-time process actual values using a displacement-measurement system assigned to the process valve, and c) analyzing the process actual data (s) dependent on the process set data (S) by comparing the process set data (S) and the process actual data (s) with each other to detect defined error states.

17 Claims, 7 Drawing Sheets

(56) References Cited

U.S. PATENT DOCUMENTS

| | | | |
|---|---|---|---|
| 2015/0142340 A1 | | 5/2015 | Radomsky et al. |
| 2016/0061347 A1 | | 3/2016 | Suzuki |
| 2016/0377673 A1 | * | 12/2016 | Cecco ................. A47L 15/0049 |
| | | | 324/511 |
| 2018/0294174 A1 | * | 10/2018 | Fujikata ............... G05B 19/058 |
| 2019/0017524 A1 | * | 1/2019 | Fechner ............. F16K 37/0008 |
| 2019/0178415 A1 | | 6/2019 | Penz et al. |
| 2020/0096132 A1 | | 3/2020 | Fassbender et al. |

FOREIGN PATENT DOCUMENTS

| | | |
|---|---|---|
| DE | 102017222463 A1 | 6/2019 |
| DE | 102018216338 A1 | 3/2020 |
| EP | 1555472 A1 | 7/2005 |
| JP | 2018119679 A | 8/2018 |

* cited by examiner

DIAGNOSIS METHOD FOR A PROCESS VALVE, DIAGNOSIS MODULE AND PROCESS VALVE

FIELD OF THE INVENTION

The invention relates to a diagnosis method for continuous function monitoring of a process valve during normal operation, to a diagnosis module for a process valve, and to a process valve.

BACKGROUND OF THE INVENTION

Process valves can be used in a variety of applications. An exemplary example is the food industry. Here, filling systems are for example used to fill liquids into containers. A filling system includes process valves, which in turn are often controlled by solenoid valves. Here, process valves are driven pneumatically, and the pneumatic pressure required therefor is in turn controlled by means of the solenoid valves.

Various approaches are known from the prior art to ensure correct functioning of process valves as far as possible.

Document EP 1 555 472 A shows a method for function monitoring in valves which serve for fluid control and which have at least one electrical actuating member for valve actuation, which is coupled to an operating-state display for displaying the current operating state of the actuating member. The method first comprises the optical detection of a change in the displayed operating state by means of an optical sensor, and the setting of the operating-state change as a start time $t_0$. Furthermore, a pressure change at the valve outlet as a result of the operating-state change is measured by means of a detection device from the start time $t_0$, and a pressure-dependent signal assigned to the pressure change is generated. The switching condition of the valve is now verified by checking whether a specific pressure-dependent signal is present after a certain time from the start time $t_0$.

SUMMARY OF THE INVENTION

One object is to detect a malfunction of a process valve without interrupting the normal operation of the process technical plant at such an early stage that a failure of the process valve during operation can be avoided as far as possible.

In this context, a diagnosis method for continuous function monitoring of a process valve during normal operation is proposed.

The diagnosis method comprises the determination of process set data with discrete-time process set values from an input signal supplied to the process valve.

The diagnosis method further comprises the determination of process actual data with discrete-time process actual values using a displacement-measurement system assigned to the process valve.

According to one aspect, the diagnosis method comprises the analyzation of the process actual data dependent on the process set data by comparing the process set data and the process actual data to thus detect defined error states.

In this way, only the displacement-measurement system of the process valve, which is present anyway, is used for the diagnosis to determine appropriate process actual data and evaluate these in conjunction with the process set data determined from the input signal of the process valve.

Advantageously, no further sensors are required. The diagnosis can take place permanently or continuously during normal operation.

According to an advantageous aspect, the process set values and the process actual values may be normalized (dimensionless) values. This simplifies a direct comparison of the process set values and the process actual values. The normalized (dimensionless) values may be derived from the corresponding positions or locations of the process valve which have been detected by means of the displacement-measurement system.

According to a further advantageous aspect, the defined error states include an insufficient mains pressure, a blocking of the process valve, a leakage, pressure surges, and/or running-time changes. Preferably, all of the aforementioned error states are detected.

An insufficient mains pressure can be detected as soon as the process actual values approach the process set values at a rate of change which is absolutely lower (in terms of amount) than a predefined rate of change. The predefined rate of change depends, among other things, on the design of the process valve, on the size thereof and possibly on other process parameters. Therefore, the predefined rate of change (as a limit value) should preferably be determined experimentally. An insufficient mains pressure can be detected particularly clearly if the process actual values approach the process set values only to such an extent that it does not fall below a predetermined minimum value difference between the process actual values and the process set values. The minimum value distance must also be selected as required or be determined experimentally.

A blocking of the process valve can be detected as soon as a rate of change of the process actual values, while the process actual values approach the process set values, decreases by a predefined minimum value to a predetermined maximum rate of change within a predetermined maximum time period. In many cases, the rate of change will drop to zero quasi-immediately in the event of a blocking. The detection is particularly clear if the process actual values do no longer reach the process set values after the change in the rate of change, i.e., do not approach them within a time period to such an extent that a predetermined minimum value difference between the process actual values and the process set values is not reached.

A leakage (for example in the lines) can be detected as soon as the process actual values increasingly move away from the process set values as time progresses, especially if the process set values are stationary. The detection is particularly clear if a minimum value distance between the process actual values and the process set values, selected as needed, is exceeded.

A pressure surge (also frequently referred to as a pressure impulse) can be detected as soon as the process actual values, for unchanged process set values, show both an increase and a decrease within a short defined time period. In particular, the rate of change of the process actual values within the time period can show more than one change of sign. The detection is particularly reliable if the process actual values and/or the rate of change do respectively not differ by more than a predefined amount before the start and after the end of the defined time period. Here, too, the predefined amount can be selected as needed.

To be able to detect a running-time change, the diagnosis method may comprise the generation of process actual reference data by storing process actual data as a function of process set data before and/or at the beginning of normal operation, and the comparison of process actual data with the corresponding process actual reference data. A running-time change is detected if rates of change of the process actual data differ from rates of change of the process reference data for identical process set data by a predetermined minimum value distance (selected as required).

Further provided is a computer-implemented diagnosis module for a process valve. The diagnosis module comprises code, by means of which the described diagnosis method can be executed on a (micro-)processor.

Furthermore, a diagnosis unit for a process valve is provided. The diagnosis unit comprises a first interface for the input signal of a process valve, a second interface for a position signal of a displacement-measurement system assigned to the process valve, a memory on which code of a diagnosis module is stored, and a processor for executing the code to carry out the diagnosis method.

Additionally provided is a process valve comprising a valve controller having a diagnosis module or a diagnosis unit.

Basically, a comparison of the process actual data with the process set data takes place when analyzing the process actual data dependent on the process set data.

Error states of the process valve which are not control errors are thus detected.

In particular, the curve progression of the process actual data, for example the curve progression of the valve position over time, is compared with the curve progression to be expected from the process set data, i.e. the curve progression based on the process set data.

The data used for comparison and based on the process set data can also be referred to as expected process actual data, wherein a corresponding expected curve progression has been generated from the process set data, which is compared with the curve progression of the process actual data to identify characteristic deviations.

In this respect, it may additionally be provided that, based on the determined process set data, expected process actual data are first determined, i.e. an expected curve progression. During the analysis, the expected process actual data are then compared with the process actual data, i.e. the expected curve progression based on the process set data is compared with the curve progression of the process actual data.

As mentioned at the beginning, the respective data are data determined by means of the displacement-measurement system, for example the valve position of the process valve. In other words, the process actual data are data determined based on the valve location or valve position, namely using the displacement-measurement system.

Thus, the actual valve position (process actual data) can be compared with the specified valve position (process set data), a corresponding deviation being identified and characterized. Depending on the characterization of the detected deviation, an associated defined error state of the process valve is thus deduced.

During comparison, characteristic deviations can therefore basically be identified, via which defined error states can be detected.

This means that a deviation of the actually present curve progression based on the process actual data from the expected curve progression based on the process set data is detected, wherein the deviation is unique for a defined error state depending on the characteristics thereof, so that the defined error state is detected on the basis of the identified deviation.

The error diagnosis is carried out during ongoing normal operation, wherein the comparison in particular does not take place if there is a set value change or only takes place if there has been no previous set value change in a defined time period, e.g. 1 second or 2 seconds. In other words, the comparison takes place if the process set data were previously stationary. In this way, it can be ensured that the process valve with the process actual data thereof could approach the process set data at all to be able to detect a corresponding defined error state.

Preferably, the comparison thus only takes place if no set value jump or set value change has previously occurred.

This is due to the fact that, according to the invention, precisely no control errors are to be detected, for example a settling time, a response time or a control deviation. Rather, a permanent error state, in particular an error state independent of the control, is to be detected, which is why the comparison of the process actual data and the process set data, in particular the curve progressions thereof, takes place if no set value change has previously occurred.

Though the analysis can take place permanently during normal operation, the comparison and thus the analysis is at least (briefly) suspended or the analysis result is discarded if a set value change has previously occurred.

In other words, the diagnosis method according to the invention thus focuses on a long-term deviation of the process actual data from the process set data, i.e. a deviation which becomes apparent over time for a given set value.

In particular, the comparison can be carried out shortly before a set value change.

During the analysis, in particular the comparison of the process set data and the process actual data, it can also be determined how fast, i.e. at which rate of change the process set data approach the process actual data, to determine whether one of the defined error states is present, in particular an insufficient mains pressure. For this purpose, the determined rate of change at which the process actual data approach the respective process set data can be compared, for example, with a reference rate of change, in particular wherein the reference rate of change has been determined from empirical data and/or historical data.

The process set data may be driving data, i.e. data used to drive the process valve.

Therefore, a comparison of the curve shapes may take place so that a corresponding characteristic deviation of the curve shape of the curve progression of the process actual data from the curve shape of the curve progression of the process set data is detected, which in turn is assigned to an associated defined error state of the process valve.

BRIEF DESCRIPTION OF THE DRAWINGS

Features and aspects of the invention will be explained in more detail below on the basis of example embodiments and with reference to the figures, in which.

DETAILED DESCRIPTION OF THE INVENTION

Figure 1:
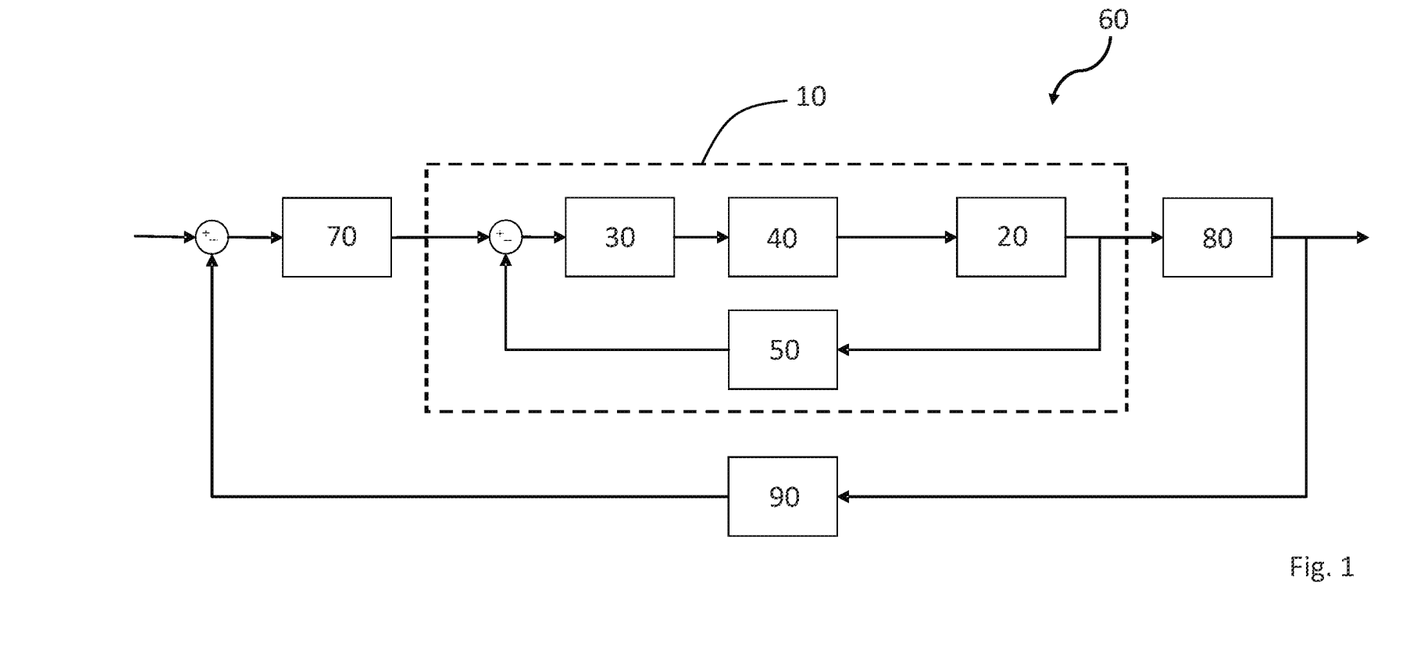
FIG. 1 shows a simplified schematic block diagram of a process control loop having a process valve.

FIG. 1 shows a process valve 10 in a process control loop 60 as a simplified block diagram. The process valve 10 includes a control valve 20, a regulation module 30, a control system 40, and a displacement-measurement system 50. The process valve 10 is integrated into the process control loop 60 along with a process controller 70, a process 80, and a process sensor 90. The process sensor 90 may be any sensor and may measure a physical quantity such as temperature, flow, or pressure.

Figure 2:
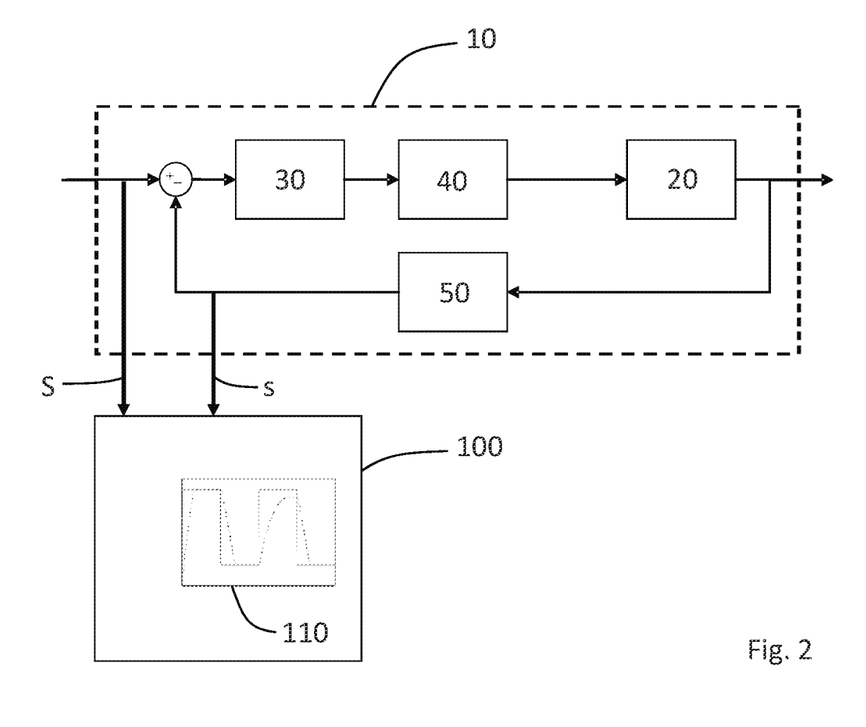
FIG. 2 shows a simplified schematic block diagram of a process valve having a diagnosis unit.

FIG. 2 shows a process valve 10 having a diagnosis unit 100 as a simplified block diagram. The diagnosis unit 100, which comprises the diagnosis module 110, is connected to a process valve 10 such that the diagnosis module 110 can process process set values S (hereinafter also simply referred to as "set values" or "set data") and process actual values s (hereinafter also referred to as "actual values" or "actual data").

The diagnosis unit 100 includes a first interface for the input signal of the process valve, a second interface for a position signal of the displacement-measurement system, a memory on which code of the diagnosis module 100 is stored, and a processor for executing the code. The computer-implemented diagnosis module 110 includes the code to execute the described diagnosis method on a processor. Alternatively, the diagnosis module 110 may be implemented as a software function directly in the valve control of the process valve 10.

Using the displacement-measurement system 50 of the process valve 10, actual data s are acquired during ongoing operation (normal operation) of the process control loop 60. The acquired actual data s are compared with known set data S. Typical errors are detected from characteristic deviations, such as problems with the mains pressure, a blocking at the valve or drive, a leakage at the drive or control system, pressure surges or running-time changes.

The diagnosis method for continuous function monitoring of a process valve 10 in normal operation comprises the steps of:
- determining process set data S with discrete-time process set values from an input signal supplied to the process valve 10,
- determining process actual data s with discrete-time process actual values by means of a displacement-measurement system 50 assigned to the process valve 10, and
- analyzing the process actual data s dependent on the process set data S by comparing the process set data (S) and the process actual data (s) with each other to detect defined error states.

The process set values and the process actual values are normalized values. Preferably, the normalized values are dimensionless.

The defined error states include an insufficient mains pressure, a blocking of the process valve, a leakage, pressure surges, and running-time changes.

In other words, typical error states in process valves can be identified by simply analyzing and comparing the actual curve with the desired curve, i.e. the curve progressions of the actual values and the set values. The curve shape in normal operation is used for this purpose.

The comparison of the actual curve with the desired curve is explained below on the basis of five characteristic deviations, which are shown in FIGS. 3 to 7 and described in more detail below.

Figure 3:
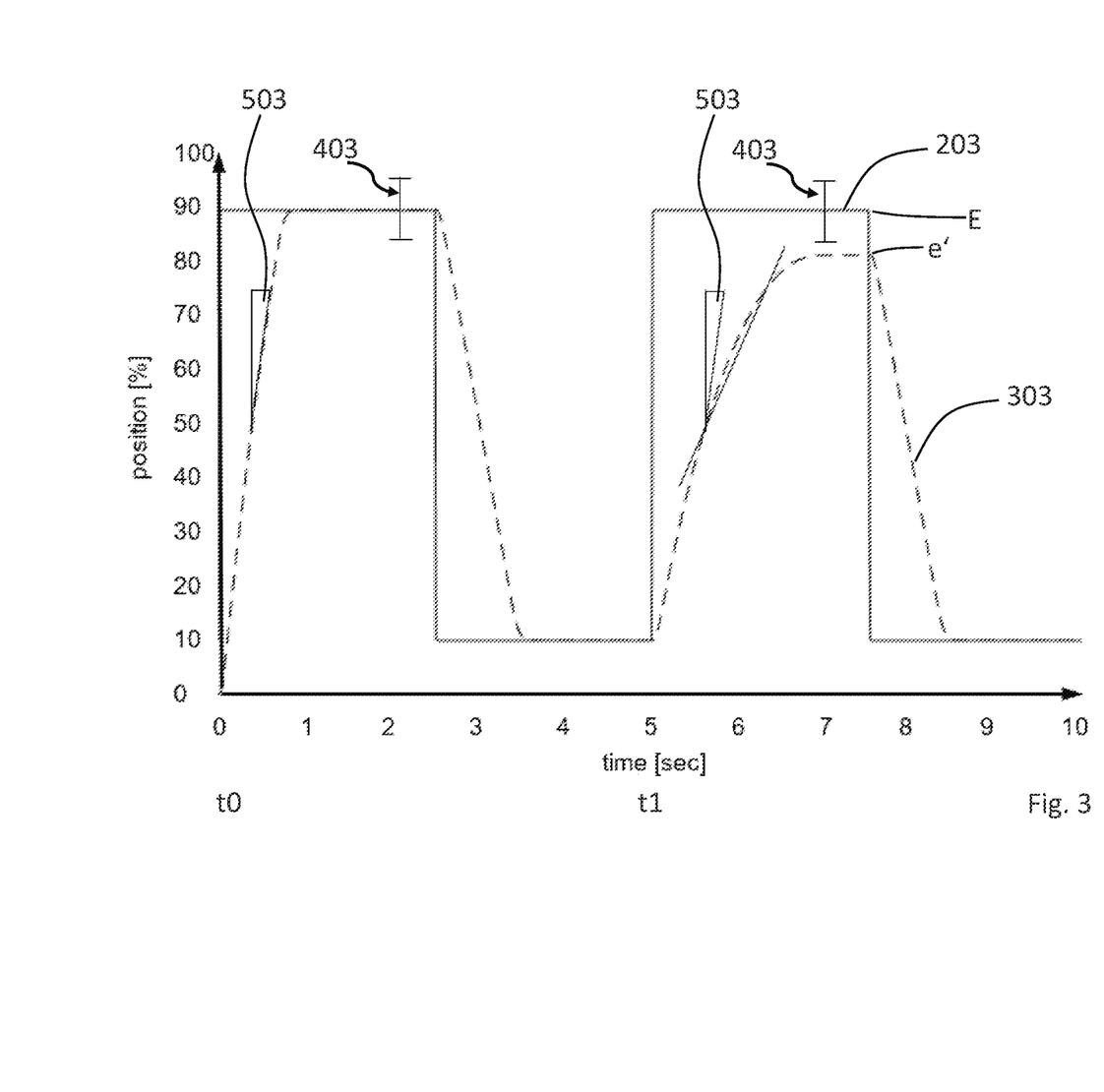
FIG. 3 shows a diagram with a schematic representation of process actual data and process set data for visualizing characteristic features during mains pressure monitoring.
Figure 4:
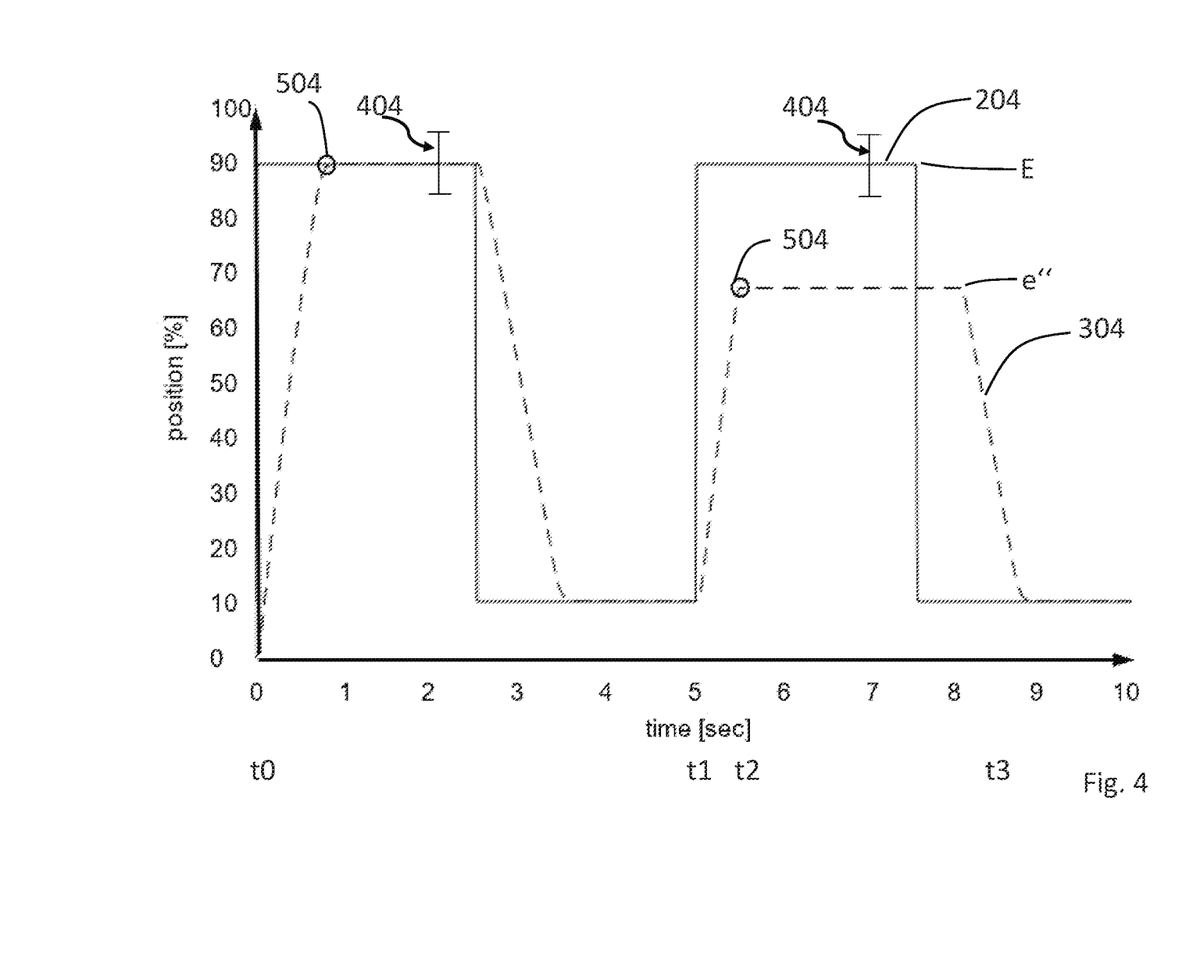
FIG. 4 shows a diagram with a schematic representation of process actual data and process set data for visualizing characteristic features in the blocking detection.

In FIGS. 3 to 7, the respective set and actual data are shown as normalized values in percent (on the y-axis) versus time in seconds (on the x-axis). The input signal is drawn as a solid line as the desired curve 203-207. In FIG. 3 and FIG. 4, the respectively associated actual curve 303-307 shows in a first part the error-free typical response of the process valve and in a second part characteristic deviations of the data, i.e. typical error states, and is drawn as a dashed line.

FIG. 3 shows characteristic deviations from a desired curve 203, as occurring if there are problems with the mains pressure, with a typical actual curve 303. During the undisturbed switching operation, which begins at time $t_0$, the actual curve 303 moves rapidly towards the final value E of the set value. In the case of the disturbed switching operation, which begins at time t1, the actual curve 303, however, moves much more slowly than normal towards a final value e' which does not correspond to the set value E. However, it is also possible that the set value E is still reached. Thus, not only the set value E is characteristic, but also the time course for reaching the set value E. An error would be, for example, not only that the set value E is not reached at all, but also that the set value E is reached, but this does not happen within a defined time.

An insufficient mains pressure is therefore detected if the process actual values 303 approach the process set values 203 at a rate of change which is absolutely (in terms of amount) lower than a predefined rate of change 503. This occurs without approaching the process set values 203 to such an extent that a predetermined minimum value distance 403 between the process actual values 303 and the process set values 203 is not reached.

FIG. 4 shows characteristic deviations from a desired curve 204, as occurring if the drive is blocked. During the switching operation, which starts at time $t_0$, the actual curve 304 reaches the final value E of the set value. In the case of the disturbed switching operation, which begins at time t1, the actual curve 304 shows a sharp break at the final value e" at time t2, which does not correspond to the set value E. The set value E is not reached until time t3.

Thus, a blocking of the process valve 10 is detected if a rate of change of the process actual values 304 decreases (abruptly) within a predetermined maximum time period 504 by a predetermined minimum value to a predetermined maximum rate of change while the process actual values 304 approach the process set values 204. This occurs without the process actual values 304 approaching the process set values 204 within a time period to such an extent that a predetermined minimum value distance 404 between the process actual values 304 and the process set values 204 is not reached.

Figure 5:
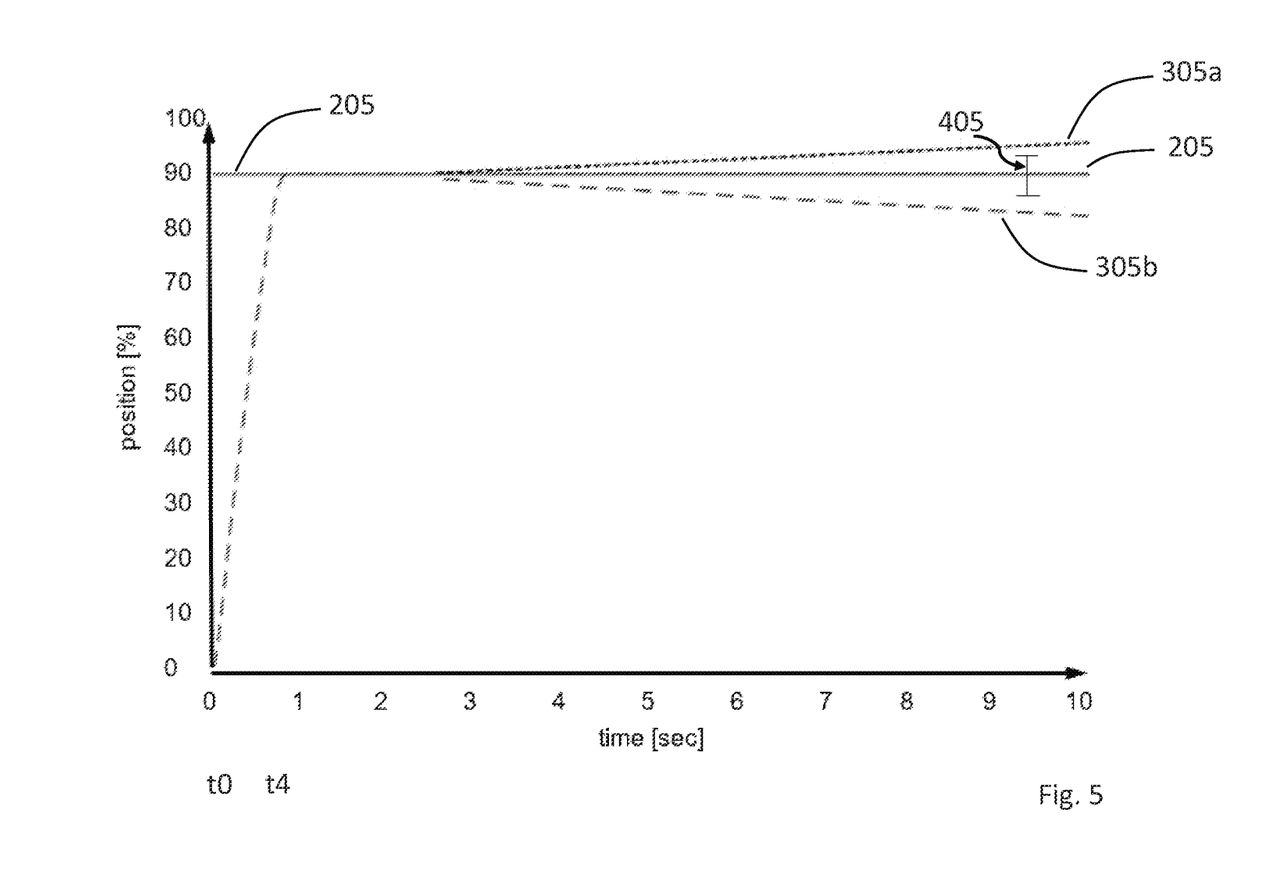
FIG. 5 shows a diagram with a schematic representation of process actual data and process set data for visualizing characteristic features during leakage monitoring.

FIG. 5 shows characteristic deviations from a desired curve 205 as occurring in the event of a leakage. After the switching operation at time $t_0$, the actual curve 305 reaches the final value E of the desired curve 205 at time t4. Although there is no change in the set value and thus the manipulated variable should not change, the actual value 305 deviates up 305a or down 305b in the event of an error. In this case, the actual value runs out of a tolerance band 405.

Therefore, a leakage is detected if the process actual values 305 increasingly move away from the process set values 205 as time progresses, though the process set values 205 are stationary. The criterion can be whether a predetermined minimum value distance 405 (the previously mentioned tolerance band) between the process actual values 305 and the process set values 205 is exceeded.

Figure 6:
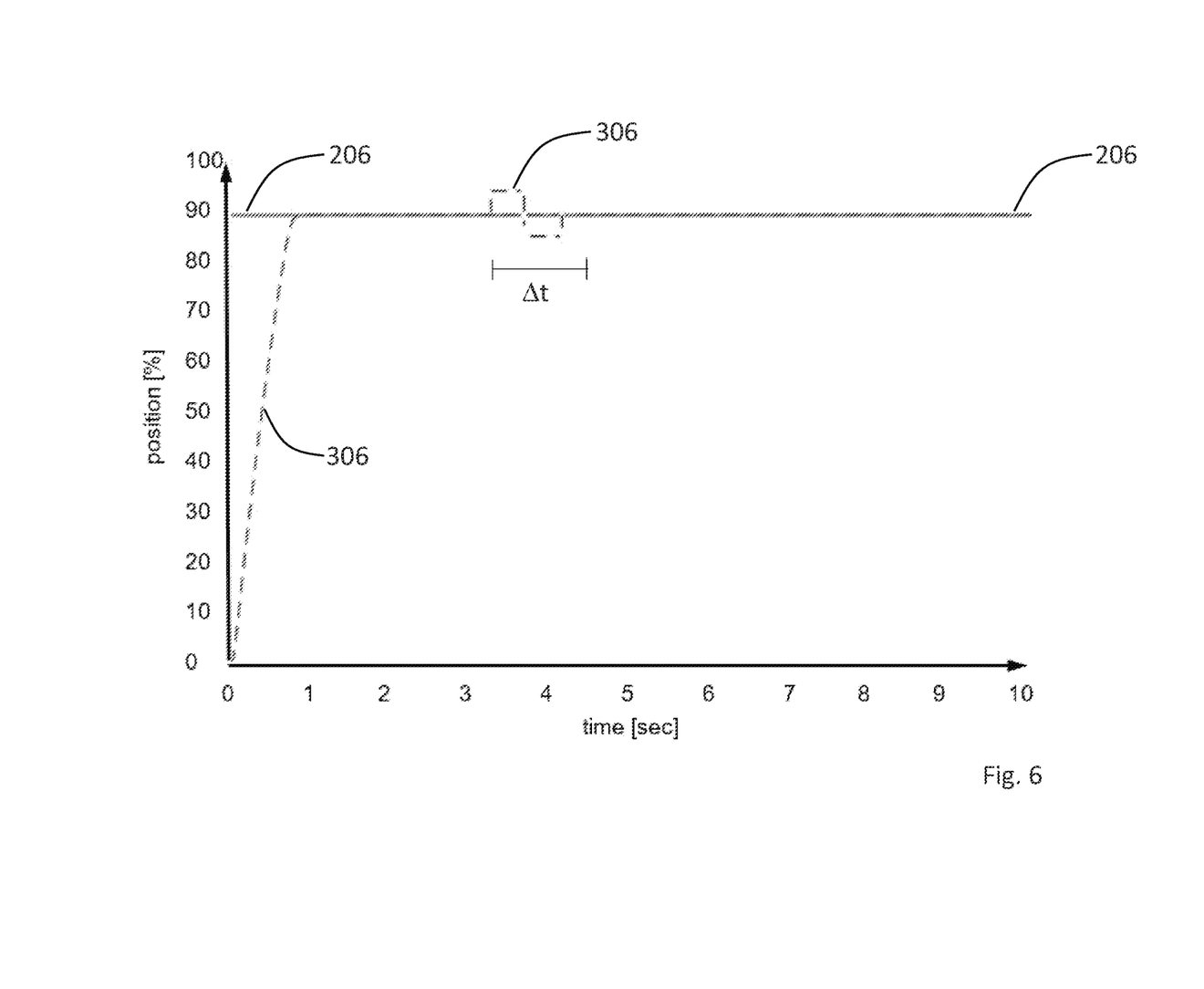
FIG. 6 shows a diagram with a schematic representation of process actual data and process set data for visualizing characteristic features in the pressure surge detection.

FIG. 6 shows characteristic deviations from a desired curve 206 as occurring in the event of a pressure surge. After the switching operation at time $t_0$, the actual curve 306 reaches the final value E of the desired curve 206 at time t5. The actual curve 306 shows the characteristic signature of a pressure surge between times t3 and t4 ($\Delta$t).

A pressure surge is detected if, for unchanged process set values 206, the process actual values 306 show both an increase and a decrease within a time period of defined length. In this case, the rate of change of the process actual values 306 exhibits more than one change in sign within the time period. The process actual values 306 or the rate of change thereof before the beginning and after the end of the time period of the pressure surge do not differ by more than a predefined amount.

Figure 7:
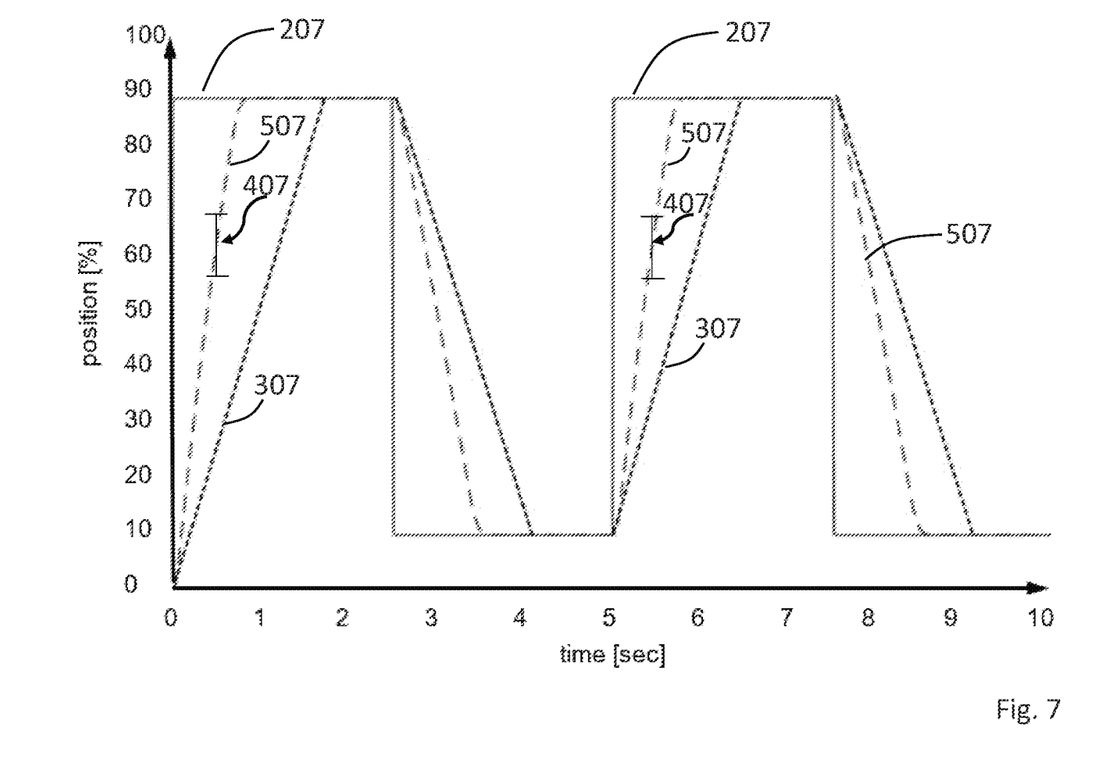
FIG. 7 shows a diagram with a schematic representation of process actual data and process set data for visualizing characteristic features in the detection of running-time changes.

FIG. 7 shows two actual curves 507, 307 and the desired curve 207. In the device new condition, the position/time curves were recorded as the x/t signature of the process valve 10 and stored in the diagnosis unit 100 as the reference curve 507. By comparing the reference with the x/t curves (e.g. actual curve 307) during normal operation, a changed friction and a resulting risk of blocking can be detected, for example.

For this purpose, the diagnosis method comprises the generation of process actual reference data by storing process actual data 507 as a function of process set data 207 before and/or at the beginning of normal operation, and the comparison of process actual data 307 with corresponding process actual reference data 507 in the ongoing operation. A running-time change is detected if rates of change of the process actual data 307 differ from rates of change of the process reference data 507 by a predetermined minimum value distance 407 for identical process set data 507.

LIST OF REFERENCE NUMERALS 10 process valve
20 control valve
30 controller module
40 control system
50 displacement-measurement system
60 process control loop
70 process controller
80 process to be controlled
90 process sensor
100 diagnosis unit
110 diagnosis module
203 . . . 207 desired curve
303 . . . 307, 507 actual curve
403 . . . 407 predetermined minimum value distance
503 predefined rate of change
504 predetermined maximum time period
S process set value
s process actual value
t0 . . . t7 points in time
E final value process set value
e' . . . e" final value process actual value

The invention claimed is:

1. A diagnosis method for continuous function monitoring of a process valve during normal operation, comprising steps of:
   a) determining process set data with discrete-time process set values from an input signal supplied to the process valve, wherein the process set data comprises a specified valve position,
   b) determining process actual data with discrete-time process actual values by means of a displacement-measurement system assigned to the process valve, wherein the process actual data comprises an actual valve position, and
   c) analyzing the process actual data dependent on the process set data by comparing the process set data and the process actual data with each other to detect defined error states,
   wherein, based on the determined process set data, an expected curve progression of expected process actual data is determined and the expected curve progression based on the process set data is compared with a curve progression of the process actual data, wherein a deviation identified between the expected curve progression and the curve progression of the process actual data is unique for a defined error so that the defined error states are detected on a basis of the identified deviation,
   wherein the defined error states comprise an insufficient mains pressure, a blocking of the process valve, a leakage, pressure surges and/or running-time changes.

2. The diagnosis method according to claim 1, wherein the process set values and the process actual values are normalized values.

3. The diagnosis method according to claim 1, wherein an insufficient mains pressure is detected if the process actual values approach the process set values at a rate of change which is lower than a predefined rate of change.

4. The diagnosis method according to claim 3, wherein the insufficient mains pressure is detected if the process actual values approach the process set values at the rate of change which is lower than the predefined rate of change without approaching the process set values to such an extent that a predetermined minimum value distance between the process actual values and the process set values is not reached.

5. The diagnosis method according to claim 1, wherein a blocking of the process valve is detected if a rate of change of the process actual values, while the process actual values approach the process set values, decreases by a predefined minimum value to a predetermined maximum rate of change within a predetermined maximum time period.

6. The diagnosis method according to claim 5, wherein the blocking of the process valve is detected if the rate of change of the process actual values while the process actual values approach the process set values decreases by the predefined minimum value to the predetermined maximum rate of change within the predetermined maximum time period without the process actual values approaching the process set values within a defined time period to such an extent that a predetermined minimum value distance between the process actual values and the process set values is not reached.

7. The diagnosis method according to claim 1, wherein a leakage is detected if the process actual values increasingly move away from the process set values as time progresses.

8. The diagnosis method according to claim 7, wherein the leakage is detected if the process actual values increasingly move away from the process set values as time progresses though the process set values are stationary.

9. The diagnosis method according to claim 7, wherein the leakage is detected if the process actual values increasingly move away from the process set values as time progresses though the process set values are stationary, wherein a predetermined minimum value distance between the process actual values and the process set values is exceeded.

10. The diagnosis method according to claim 1, wherein a pressure surge is detected if, for unchanged process set values, the process actual values show both an increase and a decrease within a time period of a defined length.

11. The diagnosis method according to claim 10, wherein a rate of change of the process actual values within the time period has more than one change of sign.

12. The diagnosis method according to claim 10, wherein a rate of change of the process actual values within the time period has more than one change of sign, wherein the process actual values and/or the rate of change each differ by no more than a predefined amount before a start of the time period and after an end of the time period.

13. The diagnosis method according to claim 1, further comprising the steps of:
   a) generating process actual reference data by storing process actual data as a function of process set data before and/or at a beginning of normal operation, and
   b) comparing process actual data with corresponding process actual reference data, wherein a running-time change is detected if rates of change of the process actual data differ from rates of change of the process reference data for identical process set data by a predetermined minimum value distance.

14. A computer-implemented diagnosis module for a process valve, wherein the diagnosis module comprises code to execute the diagnosis method according to claim 1 on a processor.

15. A diagnosis unit for a process valve, comprising a first interface for the input signal of the process valve, a second interface for a position signal of the displacement-measurement system, a processor, and a memory on which code of a computer-implemented diagnosis module for the process valve is stored to execute the diagnosis method according to claim 1 on the processor.

16. A process valve comprising a valve controller having a computer-implemented diagnosis module comprising code to execute the diagnosis method according to claim 1 on a processor and/or a diagnosis unit comprising a first interface for the input signal of the process valve, a second interface for a position signal of the displacement-measurement system, the processor, and a memory on which the code of the diagnosis module is stored to execute the diagnosis method according to claim 1 on the processor.

17. A diagnosis method for continuous function monitoring of a process valve during normal operation, comprising steps of:
   a) determining process set data with discrete-time process set values from an input signal supplied to the process valve, wherein the process set data comprises a specified valve position,
   b) determining process actual data with discrete-time process actual values by means of a displacement-measurement system assigned to the process valve, wherein the process actual data comprises an actual valve position,
   c) analyzing the process actual data comprising the actual value position dependent on the process set data comprising the specified valve position by comparing the process set data and the process actual data with each other to detect defined error states,
   d) generating process actual reference data by storing process actual data comprising an actual value position as a function of process set data comprising a specified value position before and/or at a beginning of normal operation, and
   e) comparing process actual data with corresponding process actual reference data, wherein a running-time change is detected if rates of change of the process actual data differ from rates of change of the process reference data for identical process set data by a predetermined minimum value distance.

* * * * *